(No Model.)
R. F. RICE.
MAGAZINE CAMERA.
No. 494,164. Patented Mar. 28, 1893.
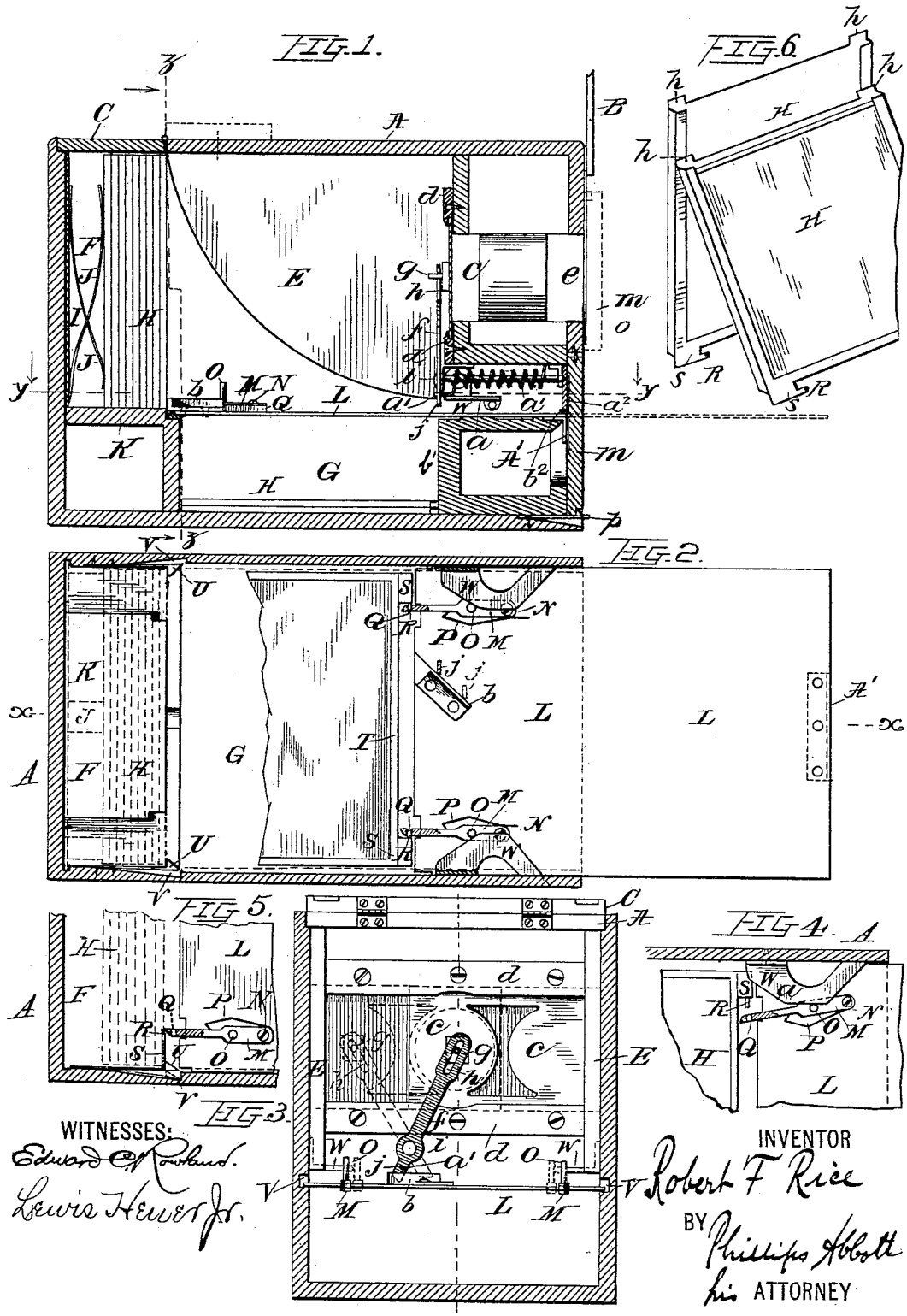
WITNESSES:
Edward C. Rowland.
Lewis Hewer Jr.
INVENTOR
Robert F. Rice
BY Phillips Abbott
his ATTORNEY

UNITED STATES PATENT OFFICE.

ROBERT F. RICE, OF HARTFORD, CONNECTICUT.

MAGAZINE-CAMERA.

SPECIFICATION forming part of Letters Patent No. 494,164, dated March 28, 1893.

Application filed July 29, 1892. Serial No. 441,623. (No model.)

*To all whom it may concern:*

Be it known that I, ROBERT F. RICE, a citizen of the United States, and a resident of Hartford, in the county of Hartford and State of Connecticut, have invented certain new and useful Improvements in Magazine-Cameras, of which the following is a specification.

My invention relates to improvements in magazine photographic cameras, and it consists in constructing the apparatus in such manner that at the end of the camera there is a chamber or receptacle within which the plate holders are placed one in front of the other with their sensitized surfaces all facing the same way, that is facing the lens. Behind the plate holders there is a follower or presser which presses the plates continually forward into the proper focal position. The apparatus is provided with a device to transfer the plates from the exposure chamber into the storage chamber of the device, being provided with hooks which catch hold of the plates and it also actuates the shutter so that at each withdrawal of this device the plate which is last exposed will be transferred from the exposure chamber into the storage chamber, and also the shutter will be set for a new exposure. The front of the camera is also provided with an automatically acting door so arranged that whenever it is opened for manipulating the plates and resetting the shutter, it will swing upwardly and cover the lens opening light tight, to prevent the admission of light during the resetting operation, and the slide, being solid and extending from side to side of the camera, acts as a cover for the storage chamber and prevents the light which enters through the lens at each exposure from acting on the plates in the storage chamber.

In the drawings hereof, Figure 1 illustrates a sectional elevation of the device taken on the line X, X, of Fig. 2, excepting that the plate manipulating slide is extended and not in its normal place within the camera. Fig. 2, is a plan view in section on the line Y, Y, of Fig. 1, the plate manipulating slide being extended. Fig. 3. is an elevation in section on the line Z, Z of Fig. 1, looking to the right as indicated by arrows. Fig. 4. is a detail of the inner end of the plate manipulating slide showing one of the latches thereon and a portion also of one of the plate holders, the parts are in position that they occupy when the latch has just let go of the plate holder permitting the plate to drop into the magazine compartment. Fig. 5. is a view similar to Fig. 4, showing one of the latches about to engage with the pin on one of the plate holders. Fig. 6 is a detail of one of the plate holders.

A is the body of the camera; it may be made of any suitable material and in any preferred form.

B is a portion of a strap by which the camera may be carried.

C is a door at the rear upper end of the camera; it is adapted to be swung upwardly and forwardly as shown.

E, E, are two pieces of wood or like material fastened against the two lateral sides of the camera, the rearward edges of which are cut on the arc of a circle as shown. They serve to guide the plates during their transference from the exposure chamber shown at F into the storage chamber, shown at G.

H are the plate holders. At their upper ends they have projecting parts $h$, $h$, one at each side which when the plates are transferred slide down the sides of the plate holder immediately behind the one being removed, as shown in Fig. 6. In this way all injury to the face of the succeeding plate is avoided.

I is a base which may be of metal or wood, to which springs J, J, are attached which normally press the plates forwardly into the proper focal position.

K is a platform upon which the lower edges of the plate holders rest to be supported in proper position for operation of the devices.

L is a slide. It is made solid, that is, without openings in it and extends from side to side of the camera, making substantially, not to say absolutely, light tight contact with the sides thereof, so that when pushed in, it acts as a cover for the storage chamber and prevents the light which enters through the lens at each exposure from injuriously affecting the plates, in the storage chamber. At each side of the slide L near its rear end are two latches M, M; they are pivoted respectively at N, N, to the slide L and are each provided with a pin O, O, and a spring P, P. The spring normally throws the latches outwardly in a lateral direction. Near the end of the latches M is a hole Q into which enters pins R projecting from metallic pieces S, S, which are fastened upon the plate holders T which surround the plates.

U, U, are two spring latches fastened at their rear ends to the sides of the camera box. They normally catch over the front edge of the most forward plate holder and hold them in position at the bottom. The uppermost part of the guide plates E, E, hold the plates in proper focal position and the spring latches, U, U, do the same at their lower ends. The adjustment of the parts, however, is such that when the slide L is pressed fully in, its corners will engage with the inclined faces of these spring latches U as one of the corners is about to do as shown in Fig. 5, and will press them outwardly into the recesses V, V, see Figs. 2 and 5, so that they release the most forward plate holder. Thus, when the latches M have engaged the pins R upon the most forward plate holder it, the plate holder will be pulled forwardly with the slide L and transferred from the exposure chamber to the storage chamber as already stated.

W, W, are two cam plates one on each side of the camera box near the forward end of the box; and they are so arranged and have such an inward projection that as the slide L approaches its most extended position, the pins O, O, upon the latches M, M, engage with the inclined or cam like surfaces of these parts W, W, as shown at $a$, and thus as the pins O slide over the inclined surfaces $a$ the latches are thrown inwardly against the stress of the respective springs P, P, and they, the latches, are disengaged from the pins R, R, on the plate holders and the plate holders drop into the storage chamber G.

$b$ is a deflecting plate on the slide L near its rear end located about centrally.

$c, c$, is the shutter. It is shown as a sliding shutter, although it may be of some other form if preferred, but as shown it slides in ways $d$, $d$, covering the exposure aperture $e$.

$f$, is a lever attached by means of a pin $g$, which plays in a slot $h$ in the lever $f$, to the shutter $c, c$, and the lever $f$ is pivoted at $i$ to some suitable portion of the camera. The lever $f$ projects downwardly as shown at $j$ in such manner as to be in the path of the deflecting plate $b$ when it moves outwardly consequent upon the withdrawal of the slide L.

$m$ is a door hinged at $n$ to the front of the camera and it is provided with a spring $o$ and a latch $p$ so that when the latch is released the door will be automatically swung upwardly into the position shown in dotted lines in Fig. 1 and close the exposure aperture $e$.

A piece of wood or metal $a^2$ which extends across the camera from side to side extending upwardly to the frame which supports the lens and which is preferably provided with felt or light excluding means $b^2$ on its lower edge, across which the slide $l$ moves, prevents light from entering the camera during the time the door $m$ is elevated. The shutter is set and is put under tension when it is in the position shown in Fig. 3. There are, of course, provided for it a suitable spring motor $a'$ or its equivalent and suitable catch to hold it against the motor and means for tripping the catch when the exposure is to be made. Neither of these parts are shown because they form no part of my invention. Any of the multitude of devices used for these purposes may be employed.

The operation of my improved apparatus is as follows: First. The plate holders are arranged as stated with the sensitive faces of the plates all facing the same way, that is to say, toward the lens, and the door C being opened they are in proper order inserted in the exposure chamber F of the camera, the follower J being inserted behind them whereby they are all pressed forwardly and the most forward one is located in proper focal plane as already explained. Before inserting the plates, however, the slide L is pulled outwardly until the extremity $j$ of the lever $f$ comes in contact with the deflecting plate $b$ and then upon further outward movement of the slide L, the lever is swung from the position shown in dotted lines in Fig. 3 to that shown in full lines in that figure, and then the catch for the shutter (not shown) which may be of any usual form takes hold upon the shutter and holds it against the stress of the spring $a'$ which actuates the lever or the shutter as the case may be. Then the plates are inserted in the exposure chamber in front of the springs J, J, and thereupon the first exposure may be made which produces the first picture. To make the next exposure the slide L is shoved entirely into the camera until the innermost corners of the slide engage with the spring catches U on both sides and press them laterally into the recesses V, V, and upon the further inward movement of the slide L, the latches M, M, engage with the pins R on the lower edges of the plates H, the meeting surfaces of the latches M and the pins R are beveled so that they slide over one another, until the ends of the pins come coincident with the holes Q in the latches and when this takes place the springs P, P, cause the pins R to enter the holes Q. It will be noticed that during this manipulation of the slide L the spring door $m$ is necessarily opened because the handle A′, see Figs. 1 and 2, cannot be reached until the door $m$ is opened and this door $m$ when released immediately flies upwardly and closes the exposure aperture $e$. Thus light is prevented from entering the camera. As soon as the latches M have taken hold of the foremost plate holder by means of the engagement of the pins R, R, on the plate with the holes Q in the latches, then the slide L is pulled outwardly again. This draws the foremost plate along with it, the upper edge of the plate holder being guided by the curved guides E, E, and when the uppermost edge of the plate holder has reached the rear side of the storage chamber G, it drops into that chamber and simultaneously with this act the pins O, O, upon the latches M, M, engage with the deflectors W, and the inclined faces $a$ of these deflectors acting against the pins O, O, move the latches inwardly, thus releasing the pins R, from the holes in the latches, and the plate holder then drops entirely within the storage chamber, and it will be noticed that after a plate has been transferred and deposited in the storage chamber that thereafter the slide L, should be shoved back again into the camera, prior to making any succeeding exposure, so that it will act as a cover for the storage chamber and protect the plate which has been transferred to it from injurious action of the light which enters at the lens, and in fact, although not necessary, it is better to shove the slide L back again into the camera prior to making even the first exposure, because although at that time there is no plate in the storage chamber, and therefore no harm could follow the penetration of the light into it, nevertheless the apparatus is much more compact if the slide be shoved back and also a uniform habit of operation is acquired by the operator, which may prevent injurious results to the plates. In this manner the exposures are made one after the other.

The exposed plates are removed from the storage chamber by pulling out the square frame $b'$ (see Fig. 1) through the open door $m$.

I claim—

1. The combination in a camera having a vertical exposure chamber and a horizontal storage chamber, of devices to support the lower edges of the plate holders in the exposure chamber both vertically and horizontally; a horizontal slide provided with devices adapted to grasp the plate holders and to displace the said horizontal supports, the said slide being located in front of the exposure chamber and flatwise over the storage chamber as a cover therefor, substantially as set forth.

2. The combination in a camera having a vertical exposure chamber and a horizontal storage chamber of devices to support the lower edges of the plate holders in the exposure chamber both vertically and horizontally; a horizontal slide provided with devices adapted to grasp the plate holders and to displace said horizontal supports, the said slide being a solid one and located in front of the exposure chamber and flatwise over the storage chamber as a cover therefor, and guides for the plate holders during their movement from one chamber to the other, substantially as set forth.

3. The combination in a camera of a vertical exposure chamber, a horizontal storage chamber both adapted to contain a series of plate holders, a solid slide located in front of the exposure chamber, and flatwise over the storage chamber, as a cover therefor, devices on the slide adapted to engage with the plate holders and to displace the horizontal supports for the lower edge thereof, said horizontal supports themselves, a deflector on the slide, and a lever for the shutter which engages with the deflector, substantially as set forth.

4. The combination in a camera of a solid slide having pivoted levers adapted to catch hold of projections on the plate holders, said slide moving horizontally over the storage chamber and acting as a cover therefor when closed and deflectors on the camera which when the slide is extended cause the pivoted levers to let go of the plate holders, substantially as set forth.

Signed at Hartford, in the county of Hartford and State of Connecticut, this 25th day of July, A. D. 1892.

ROBERT F. RICE.

Witnesses:
JOHN E. HIGGINS,
JOHN A. CARROLL.